United States Patent
Patel et al.

(10) Patent No.: US 9,454,168 B2
(45) Date of Patent: Sep. 27, 2016

(54) LDO REGULATOR POWERED BY ITS REGULATED OUTPUT VOLTAGE FOR HIGH PSRR

(71) Applicant: Linear Technology Corporation, Milpitas, CA (US)

(72) Inventors: Amitkumar P. Patel, San Jose, CA (US); Carl Nelson, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 14/706,555

(22) Filed: May 7, 2015

(65) Prior Publication Data

US 2015/0362936 A1    Dec. 17, 2015

Related U.S. Application Data

(60) Provisional application No. 62/012,661, filed on Jun. 16, 2014.

(51) Int. Cl.
| | |
|---|---|
| *G05F 1/575* | (2006.01) |
| *G05F 1/563* | (2006.01) |
| *G05F 1/59* | (2006.01) |
| *H02M 1/00* | (2006.01) |

(52) U.S. Cl.
CPC ............ *G05F 1/575* (2013.01); *G05F 1/563* (2013.01); *G05F 1/59* (2013.01); *H02M 2001/007* (2013.01)

(58) Field of Classification Search
CPC ... H02M 2001/007; G05F 1/575; G05F 1/563; G05F 1/59
USPC .............. 323/266, 271, 273, 280, 282
See application file for complete search history.

(56) References Cited

U.S. PATENT DOCUMENTS

| | | | |
|---|---|---|---|
| 2014/0266104 A1* | 9/2014 | El-Nozahi | G05F 1/575 323/280 |
| 2015/0198960 A1* | 7/2015 | Zhang | G05F 1/56 323/280 |

* cited by examiner

*Primary Examiner* — Timothy J Dole
*Assistant Examiner* — Ishrat Jamali
(74) *Attorney, Agent, or Firm* — Patent Law Group LLP; Brian D. Ogonowsky

(57) ABSTRACT

In an LDO regulator, two feedback loops are created. The first feedback loop includes a high power PNP bipolar power transistor connected in series between the input voltage Vin terminal and the output voltage Vout terminal. The first feedback loop includes a first error amplifier that controls a drive transistor to drive the base of the power transistor such that Vout matches a set voltage Vset. This first feedback loop circuitry uses an operating voltage (the upper rail voltage) that is regulated by a second feedback loop and is approximately 300 mV greater than Vout. As a result, the control circuitry will be powered by a low ripple supply to improve output PSRR. Further, the power transistor is connected such that any noise in the input voltage is a common mode voltage across the base-emitter of the transistor.

19 Claims, 2 Drawing Sheets

LDO REGULATOR POWERED BY ITS REGULATED OUTPUT VOLTAGE FOR HIGH PSRR

CROSS REFERENCE TO RELATED APPLICATIONS

This application claims priority from U.S. provisional application Ser. No. 62/012,661, by Amitkumar P. Patel et al., filed Jun. 16, 2014, assigned to the present assignee and incorporated by reference.

FIELD OF INVENTION

The present invention relates to low dropout (LDO) regulators, also known as linear regulators, and, in particular, to a technique for operating the LDO regulator components from the regulated voltage for improving the PSRR of the LDO.

BACKGROUND

Good Power Supply Rejection Ratio (PSRR) is an important performance metric for modern high performance linear regulators. While switched-mode DC-to-DC converters are usually preferred for their higher efficiencies, they have a relatively high output voltage ripple which makes them unsuitable for powering sensitive analog/RF circuitries, such as ADCs, DACs, PLLs, VCOs, etc.

An LDO regulator does not have any switching ripple so is commonly used for such analog circuits. An LDO regulator may receive as an input voltage a power supply voltage or an output of a switching voltage regulator whose output is slightly greater than the target voltage output from the LDO regulator.

As the switching frequencies of modern DC-DC converters increase to reduce the component sizes, to reduce the ripple peak-to-peak voltage, and to improve the transient performance, it is becoming increasingly difficult for LDO regulators to suppress the resulting higher frequency ripple since the high frequency may be beyond the bandwidth of the LDO regulator. While increasing the LDO regulator's bandwidth may improve its high frequency PSRR, it is rather difficult to achieve such a high bandwidth while maintaining loop stability over a wide range of operating conditions and output capacitor types, especially when a large power transistor is used in the LDO regulator.

Low dropout PNP bipolar transistor regulators offer a number of benefits which are difficult to replicate with NPN, NMOS, or PMOS transistor based linear regulators, such as reverse input protection, reverse current protection, reverse output protection, low dropout in single supply operation, and low minimum input voltage Vin.

To improve the PSRR in an LDO regulator, various techniques have been used in the prior art.

FIG. 1 illustrates cascoding the PNP bipolar power transistor 12 with a cascode transistor 14, biased by a voltage source 16, to increase the impedance between the input and output terminals of the LDO regulator. This improves PSRR but at the cost of higher dropout voltage and larger die area, as it requires two power transistors. An error amplifier 18 is used in a feedback loop to adjust the conductivity of the power transistor 12 so that the output voltage Vout matches a set voltage Vset, typically set by the user. A load is typically connected between Vout and ground.

FIG. 2 illustrates another approach using an NPN/NMOS based power transistor 20 to achieve better PSRR because its input impedance is inherently higher, its output impedance is inherently lower, and it has lower DC loop gain (thereby making it easier to achieve a higher bandwidth). But it also requires a higher dropout voltage or another supply rail to drive the NPN transistor's base current.

FIG. 3 illustrates stacking two LDO regulators (LDO1 and LDO2) in series, and independently controlling them, to improve PSRR. But this brute force approach requires an additional capacitor, doubles the circuit area, and increases the dropout voltage.

What is needed is an LDO regulator design that has very low dropout voltage, has a high bandwidth, has good PSRR, and achieves the improvement with a minimum of additional circuitry.

SUMMARY

In an embodiment of the improved LDO regulator, two feedback loops are created. The first feedback loop includes a high power PNP bipolar power transistor connected in series between the input voltage Vin terminal and the output voltage Vout terminal. The first feedback loop includes a first error amplifier that controls a drive transistor to drive the base of the power transistor such that Vout matches a set voltage Vset. This first feedback loop circuitry uses an operating voltage (the upper rail voltage) that is regulated by a second feedback loop and is approximately 300 mV greater than Vout. Therefore, the upper rail voltage for the first feedback loop tracks the regulated Vout. Both the first error amplifier and a reference current source used to create Vset are powered by the regulated upper rail voltage. As a result, there will be very little noise, stemming from power supply fluctuations, contributed by the control circuitry at the output of the power transistor.

The second feedback loop includes a second error amplifier that is directly powered by the regulated Vout, so as to keep the second feedback loop low noise. Vout is also applied to a non-inverting input terminal of the second error amplifier. The second feedback loop generates the regulated Vout plus 300 mV for use as the upper rail voltage for the first feedback loop. A first transistor in the second feedback loop supplies a known current through a resistor to subtract 300 mV from the upper rail voltage, and the resulting signal is applied to the inverting input of the second error amplifier. The second feedback loop operates to match the inputs into the second error amplifier. Other voltages can be generated instead of the Vout plus 300 mV, depending on the required parameters of the system.

Further, the power transistor and the first transistor are each connected such that any noise in the input voltage is a common mode voltage across the base-emitter of the transistors so does not significantly affect the current conducted by the transistors.

Since the control circuitry for the PNP bipolar power transistor is virtually noiseless, and there is only common mode injection of Vin noise across the base-emitter of the power transistor, the PSRR is improved while a low dropout voltage is maintained by the power transistor being connected across the input voltage and output voltage terminals.

In one embodiment, the input voltage is provided by an unregulated power supply. In another embodiment, for higher efficiency, the input voltage is provided by a switching voltage regulator, and the LDO regulator removes the ripple as well as changes the level of the switching regulator's output voltage. This allows the switching regulator to have a much smaller output (smoothing) capacitor.

Other embodiments are described.

BRIEF DESCRIPTION OF THE DRAWINGS

Elements in the various figures that are the same or equivalent are labeled with the same numeral.

DETAILED DESCRIPTION

Figure 1:
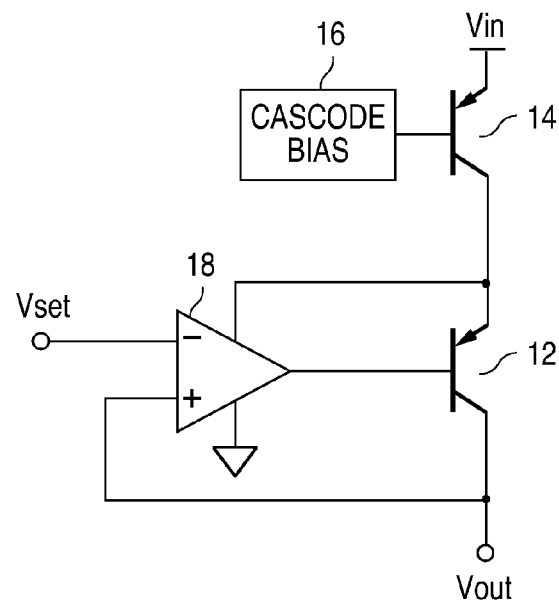
FIG. 1 illustrates a first prior art LDO regulator.
Figure 2:
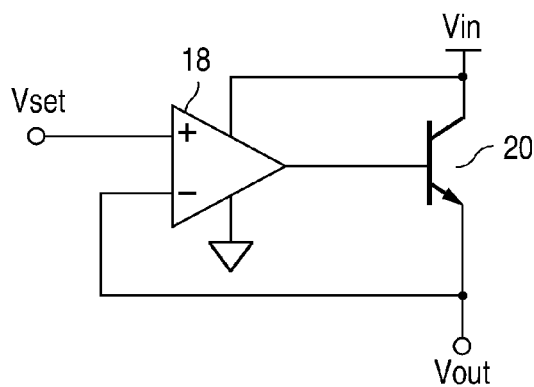
FIG. 2 illustrates a second prior art LDO regulator.
Figure 3:
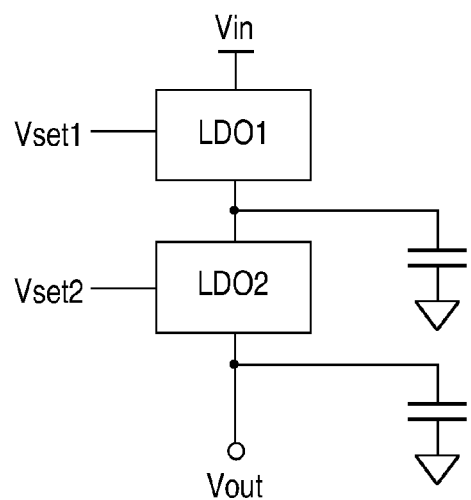
FIG. 3 illustrates a third prior art LDO regulator.
Figure 4:
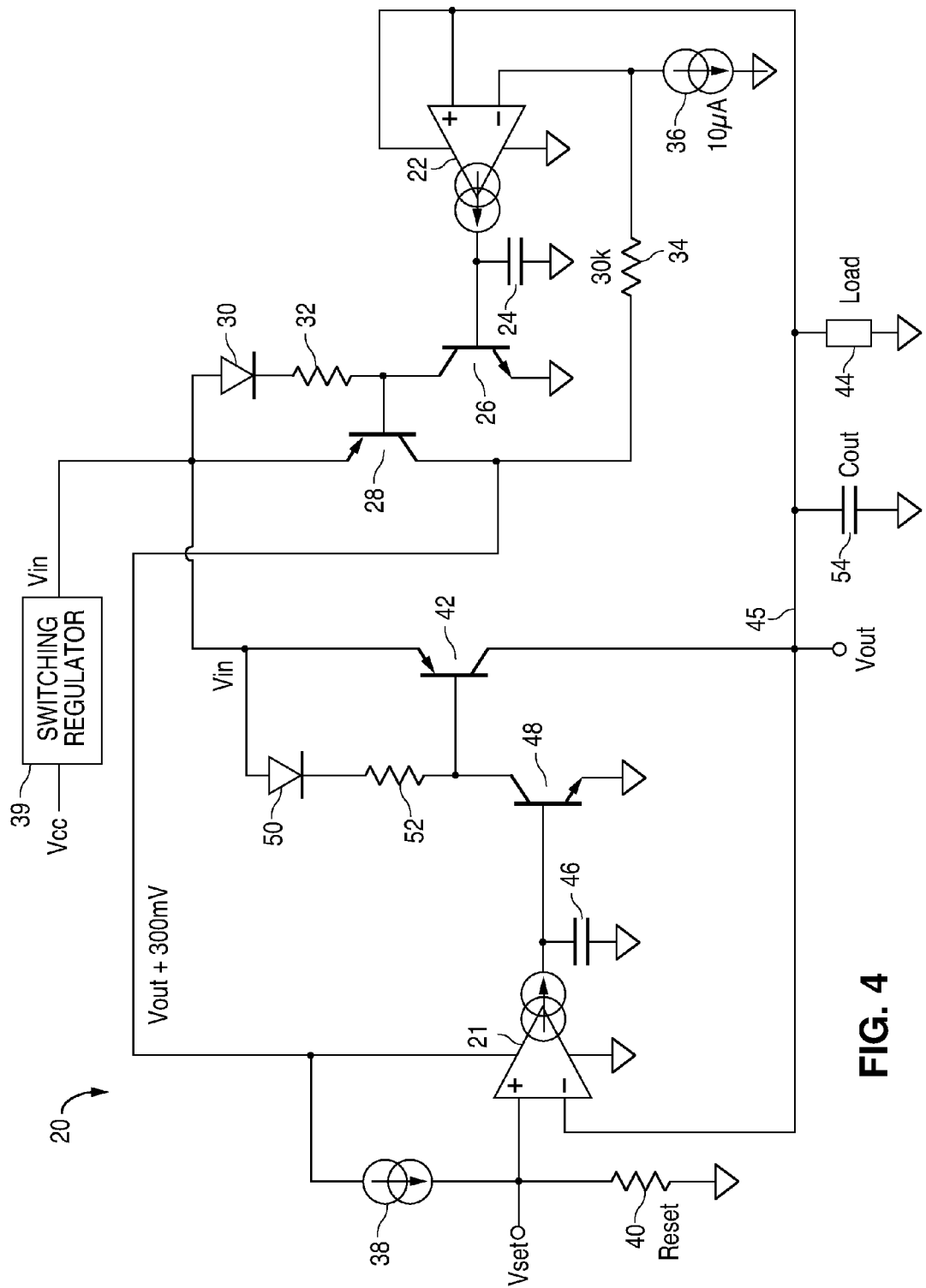
FIG. 4 illustrates an LDO regulator in accordance with an embodiment of the invention.

FIG. 4 illustrates an LDO regulator (or linear regulator) in accordance with the present invention.

In the LDO regulator 20 of FIG. 4, an error amplifier 21 (a transconductance amplifier) has its input power terminals coupled to a regulated (noiseless) upper rail voltage, equal to Vout+300 mV, and to a lower rail ground voltage. Thus, the upper rail voltage tracks the regulated Vout. In contrast, the conventional approach is to directly power all circuitry by the noisy input power supply. As a result, there will be very little noise, stemming from power supply fluctuations, contributed by the control circuitry of the LDO regulator.

The regulated upper rail voltage of Vout+300 mV is generated by the feedback circuit on the right side of FIG. 4. The regulated output voltage Vout of the LDO regulator 20 is coupled to the non-inverting input of the error amplifier 22 (a transconductance amplifier). The output of the error amplifier 22 biases a capacitor 24 depending on the relative levels of the error amplifier's 22 input voltages. The resulting voltage is applied to the base of an NPN bipolar transistor 26.

The emitter of the transistor 26 is connected to ground. The collector of the transistor 26 is connected to the emitter of a PNP bipolar transistor 28 via a diode 30 and a resistor 32. The emitter of the transistor 28 is connected to the input voltage Vin. In the example of FIG. 4, because Vin is the output of a switching converter (used for high efficiency), it will inherently contain ripple at the switching frequency and require post-regulation by a high PSRR LDO regulator. The LDO regulator must thus set the level of Vout, while also removing the relatively high frequency ripple. For the highest efficiency, Vin should only be slightly above the target Vout.

The diode 30 and resistor 32 drop a voltage determined by the current through the transistor 26. The collector of the transistor 26 is also directly connected to the base of the transistor 28. The current though the transistor 26 thus determines the base-emitter forward biasing voltage of the transistor 28 and, as a result, the transistor's 28 collector current.

Since transistor 28 and diode 30 are powered from Vin, and given that any noise on Vin is a common mode voltage across the base-emitter of transistor 28, the output voltage tracking rail (the upper rail voltage) is fairly low noise.

The collector of the PNP bipolar transistor 28 is connected to a 30K ohm resistor 34 in series between the collector and the inverting terminal of the error amplifier 22. A 10 uA current source 36 is connected between the inverting terminal and ground to drop 300 mV across the resistor 34. Other values of the resistor 34 and current source 36 can be used, depending on the operating voltage requirements of the error amplifier 21. Generally, it is desired to make the upper rail voltage slightly higher than the minimum operating voltage of the error amplifier 21, given the particular input voltages into the error amplifier 21.

The feedback loop tries to match the inputs into the amplifier 22. Therefore, the collector of the transistor 28 will be at a regulated voltage of about Vout+300 mV, and this voltage serves as the upper rail voltage of the error amplifier 21.

The Vout+300 mV upper rail voltage also supplies a substantially ripple-free operating voltage for a current source 38 (a reference current source), which draws a known fixed current through a set resistor 40 connected to ground. The value Rset of the set resistor 40 is selected, such as by the user, so that the voltage drop across the resistor 40 is equal to the desired output voltage Vout of the LDO regulator 20. This set voltage Vset is applied to the non-inverting terminal of the error amplifier 21.

The output of the conventional switching voltage regulator 39, preferably supplying a regulated Vin close to the desired Vout, is directly applied to the emitter of a PNP bipolar power transistor 42 so there can be a very small voltage drop between Vin and Vout. The power transistor 42 may be large to supply a high current to a load 44, connected between the output terminal 45 and ground.

The output of the switching regulator 32 has ripple at its switching frequency. The switching frequency is typically between 100 KHz-5 MHz. The ripple may be smoothed somewhat by increasing the switching regulator's filter components' size (not shown). With a high PSRR LDO regulator, a large filter capacitor is not needed since the LDO regulator 20 will reject any input ripple from propagating to the output.

The switching regulator 39 may be any type of regulator, such as a buck, boost, buck-boost, flyback, etc. In a typical switching regulator, a switching transistor is coupled to an inductor and, for a buck regulator, the transistor intermittently couples one end of the inductor to a power supply voltage. The inductor thus is alternatingly charged and discharged. A synchronous rectifier or diode conducts the discharging current when the power switch is off. The ramping current through the inductor is smoothed by an output capacitor to create the input voltage Vin for the LDO regulator 20. A feedback path between the output capacitor and an error amplifier in the switching regulator 39 causes the switching duty cycle to be adjusted so that the output voltage (or a divided output voltage) matches a reference voltage applied to the switching regulator's error amplifier. The switching frequency may be set by an oscillator that resets (turns on) the switching transistor at the beginning of each clock cycle.

The collector of the power transistor 42 supplies the regulated Vout. Vout is connected to the inverting input terminal of the error amplifier 21, and a feedback loop matches Vout to Vset.

The output of the error amplifier 21 biases a capacitor 46, and the resulting voltage is coupled to the base of an NPN bipolar transistor 48, which is the driver for the power transistor 42. The collector of the transistor 48 is connected to the base of the power transistor 42 for controlling the current through the power transistor 42 for generating the desired Vout.

The emitter of the transistor 48 is connected to ground either directly or through a resistor. The collector of the transistor 48 is connected to the base of the power transistor 42 and a diode 50 through a resistor 52. The diode 50 and resistor 52 drop a voltage, determined by the current through the transistor 48, to cause the power transistor 42 base-emitter to become forward biased to control the power transistor's 42 collector current. Any ripple in the switching regulator 32 output is a common mode voltage across the base-emitter of the power transistor 42 so does not significantly affect the current through the power transistor 42.

Preferably, the output of the switching regulator 39 is close to the desired Vout so there will not be a large voltage difference across the power transistor 42. In other words, the voltage dropout will be very low to achieve high efficiency. The output voltage of the switching regulator 32 is typically set by the user by an external resistance.

Since the set voltage Vset at the non-inverting input of the error amplifier 21 is constant and has low ripple due to the external bypass capacitor placed on this node, and the error amplifier 21 is operated using a low ripple operating voltage, the feedback loop substantially adjusts the conductivity of the power transistor 42 to effectively filter out the high frequency ripple in Vin from the switching regulator 32.

The various transistors may instead be MOSFETs or other types of transistors. The polarities of the transistors may be reversed if the regulator operates with a negative voltage relative to ground.

An output capacitor 54 is connected to the output terminal 45 of the LDO regulator 20 to further filter high frequency input ripple and stabilize the LDO regulator 20. All capacitors used in the LDO regulator 20 and switching regulator 32 may be small since the LDO regulator 20 offers high power supply ripple rejection. Therefore, compared to the prior art, the circuit offers better noise rejection without sacrificing dropout voltage and without requiring large capacitors.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A regulator comprising:
   a linear regulator having an input voltage terminal, for receiving an input voltage, and having an output voltage terminal, for providing a regulated output voltage Vout, the linear regulator comprising:
      a first feedback loop comprising a first error amplifier and a reference current source, wherein the error amplifier and reference current source are powered by an upper rail voltage and a lower rail voltage, wherein the upper rail voltage tracks Vout;
      a power transistor coupled between the input voltage terminal and the output voltage terminal, a conductivity of the power transistor being controlled by an output of the first error amplifier to generate Vout; and
      a second feedback loop for generating the upper rail voltage comprising:
         a second error amplifier having a first input coupled to receive Vout, an output of the second error amplifier controlling a first circuit in the second feedback loop for generating the upper rail voltage that tracks Vout.

2. The regulator of claim 1 wherein the first circuit comprises:
   a PNP bipolar first transistor controlled by the output of the second error amplifier;
   a first resistance having a first end coupled to a collector of the first transistor and a second end coupled to a second input of the second error amplifier for dropping a first voltage across the first resistance, such that the second feedback loop causes the voltages at the first and second inputs of the second error amplifier to approximately match,
   wherein a voltage at the first end of the first resistance equals Vout plus the first voltage, which is the upper rail voltage for the first error amplifier.

3. The regulator of claim 2 further comprising a set voltage generator comprising:
   a first current source powered by the upper rail voltage;
   a second resistance coupled between the first current source and ground, wherein a node between the first current source and the second resistance is coupled to a second input of the first error amplifier for providing a set voltage, wherein the regulator controls Vout such that the voltage corresponding to Vout substantially matches the set voltage.

4. The regulator of claim 2 further comprising a first current source coupled between the second end of the first resistance and ground for drawing a known current through the first resistance to generate the first voltage drop.

5. The regulator of claim 2 wherein the first circuit further comprises:
   an NPN bipolar second transistor having a base coupled to the output of the second error amplifier and having a collector coupled to a base of the first transistor.

6. The regulator of claim 1 wherein the first feedback circuit further comprises:
   a bipolar driver transistor coupled to an output of the first error amplifier; and
   a collector of the driver transistor coupled to a base of the power transistor, wherein the power transistor is a PNP bipolar transistor.

7. The regulator of claim 1 wherein the voltage corresponding to Vout equals Vout.

8. The regulator of claim 1 wherein the voltage corresponding to Vout equals a divided Vout.

9. The regulator of claim 1 further comprising a switching voltage regulator generating the input voltage for the linear regulator.

10. The regulator of claim 1 further comprising a load coupled between the output terminal of the regulator and ground, wherein a current through the power transistor and load results in the regulated Vout at the output terminal.

11. The regulator of claim 1 wherein the regulator is formed on a single integrated circuit chip.

12. The regulator of claim 1 wherein the lower rail voltage is ground.

13. A method for operating a linear voltage regulator, the linear regulator having an input voltage terminal, for receiving an input voltage, and having an output voltage terminal, for providing a regulated output voltage Vout, the method comprising:
    controlling a power transistor, coupled between the input voltage terminal and the output voltage terminal, by a first feedback loop, the first feedback loop including a first error amplifier, wherein a conductivity of the power transistor is controlled by an output of the first error amplifier to generate Vout;
    powering the first error amplifier by an upper rail voltage and a lower rail voltage, the first error amplifier having a first input coupled to receive a voltage corresponding to Vout; and
    generating the upper rail voltage by a second feedback loop, the second feedback loop including a second error amplifier having a first input coupled to receive Vout, an output of the second error amplifier controlling a first circuit in the second feedback loop for generating the upper rail voltage, wherein a level of the upper rail voltage tracks Vout.

14. The method of claim 13 wherein the first circuit comprises a PNP bipolar first transistor and a first resistance having a first end coupled to a collector of the first transistor and a second end coupled to a second input of the second error amplifier, the method further comprising:
controlling the PNP bipolar first transistor by the output of the second error amplifier; and
dropping a first voltage across the first resistance, such that the voltage at the first and second inputs of the second error amplifier approximately match,
wherein a voltage at the first end of the first resistance equals Vout plus the first voltage, which is the upper rail voltage for the first error amplifier.

15. The method of claim 14 further comprising:
generating a set voltage applied to a second input of the first error amplifier by the method comprising:
generating a first current by a first current source powered by the upper rail voltage; and
flowing the first current through a second resistance coupled between the first current source and ground, wherein a node between the first current source and the second resistance is coupled to a second input of the first error amplifier for providing the set voltage, wherein the regulator controls Vout such that the voltage corresponding to Vout substantially matches the set voltage.

16. The method of claim 14 further comprising:
flowing a first current through the first resistance, by a first current source coupled between the second end of the first resistance and ground, to generate the first voltage drop.

17. The method of claim 13 wherein the voltage corresponding to Vout equals Vout.

18. The method of claim 13 wherein the voltage corresponding to Vout equals a divided Vout.

19. The method of claim 13 further comprising powering a load coupled between the output terminal of the regulator and ground, wherein a current through the power transistor and load results in the regulated Vout at the output terminal.

* * * * *